United States Patent
Laycock et al.

(10) Patent No.: US 11,615,496 B2
(45) Date of Patent: Mar. 28, 2023

(54) PROVIDING SECURITY AND CUSTOMER SERVICE USING VIDEO ANALYTICS AND LOCATION TRACKING

(71) Applicant: Honeywell International Inc., Charlotte, NC (US)

(72) Inventors: Graeme Laycock, Hunters Hill (AU); Alyanna Agda, North Rocks (AU); Kendall Paix, Cherrybrook (AU); Andrew Arlen, North Rocks (AU); Samir Dudani, Sydney (AU)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 17/551,917

(22) Filed: Dec. 15, 2021

(65) Prior Publication Data
US 2022/0108414 A1    Apr. 7, 2022

Related U.S. Application Data

(63) Continuation of application No. 15/946,359, filed on Apr. 5, 2018, now Pat. No. 11,227,353.

(51) Int. Cl.
*G06Q 10/06* (2012.01)
*G06Q 50/26* (2012.01)
(Continued)

(52) U.S. Cl.
CPC ..... *G06Q 50/265* (2013.01); *G06Q 10/06311* (2013.01); *G06Q 10/06316* (2013.01);
(Continued)

(58) Field of Classification Search
None
See application file for complete search history.

(56) References Cited

U.S. PATENT DOCUMENTS 10,027,711 B2   7/2018   Gill et al.
10,037,821 B2   7/2018   Johnson et al.
(Continued)

OTHER PUBLICATIONS

Miyaki et al. (T. Miyaki, T. Yamasaki and K. Aizawa, "Tracking Persons using Particle Filter Fusing Visual and Wi-Fi Localizations for Widely Distributed Camera," 2007 IEEE International Conference on Image Processing, 2007, pp. III-225-III-228, doi: 10.1109/ICIP.2007.4379287. 2007).*

(Continued)

*Primary Examiner* — Matthew D Henry
(74) *Attorney, Agent, or Firm* — Seager, Tufte & Wickhem, LLP

(57) ABSTRACT

Devices, methods, and systems for providing security and customer service using video analytics and location tracking are described herein. One device includes a memory, and a processor configured to execute executable instructions stored in the memory to identify, using video analytics, security incidents occurring in a facility and customer service opportunities occurring in the facility, determine, upon identifying a security incident occurring in the facility, a workflow sequence for responding to the security incident, determine, upon identifying a customer service opportunity occurring in the facility, a workflow sequence for responding to the customer service opportunity, display the workflow sequence for responding to the security incident on a first user interface, and display the workflow sequence for responding to the customer service opportunity on a second user interface.

15 Claims, 2 Drawing Sheets

(51) Int. Cl.
    *G06Q 10/0631*     (2023.01)
    *G06V 20/40*     (2022.01)
    *G06V 20/52*     (2022.01)
    *G06V 40/16*     (2022.01)

(52) U.S. Cl.
    CPC .............. *G06V 20/41* (2022.01); *G06V 20/52* (2022.01); *G06V 40/172* (2022.01)

(56) References Cited

U.S. PATENT DOCUMENTS

| | | | | |
|---|---|---|---|---|
| 2002/0016740 | A1* | 2/2002 | Ogasawara | G07G 1/0036 705/14.27 |
| 2003/0122667 | A1* | 7/2003 | Flynn | G08B 13/19689 340/572.1 |
| 2009/0146829 | A1* | 6/2009 | Whillock | G06F 16/784 340/686.6 |
| 2011/0231419 | A1* | 9/2011 | Papke | G06F 16/784 707/769 |
| 2012/0286932 | A1* | 11/2012 | Lewis | G08B 7/066 340/6.1 |
| 2015/0187038 | A1* | 7/2015 | Johnson | G06Q 30/0203 705/2 |
| 2016/0284142 | A1* | 9/2016 | Elbling | E06B 11/08 |
| 2017/0060601 | A1 | 3/2017 | Joshi et al. | |

OTHER PUBLICATIONS

Miyaki et al; "Tracking Persons using Particle Filter Fusing Visual and Wi-Fi Localizations for Widely Distributed Camera," 2007 International Conference on Image Processing, pp. III-225-III-228, doi: 10.1109/ICIP.2007.4379287.2007), 2007.

* cited by examiner

PROVIDING SECURITY AND CUSTOMER SERVICE USING VIDEO ANALYTICS AND LOCATION TRACKING

This is a continuation of co-pending U.S. patent application Ser. No. 15/946,359, filed Apr. 5, 2018, and entitled "PROVIDING SECURITY AND CUSTOMER SERVICE USING VIDEO ANALYTICS AND LOCATION TRACKING", which is incorporated herein by reference.

TECHNICAL FIELD

The present disclosure relates generally to devices, methods, and systems for providing security and customer service using video analytics and location tracking.

BACKGROUND

There are many different types of incidents that may occur in a facility (e.g., building) that may threaten the safety and/or security of the facility and/or the people in the facility. It is important for a security system (e.g., security operations) to be capable of identifying (e.g., detecting) and responding to such incidents quickly and efficiently in order to minimize the risks and threats associated with such incidents.

There are also may different types of customer service opportunities that may occur (e.g. arise) in a facility. In a customer service environment (e.g., customer service operations), it is important to identify and respond to such opportunities quickly and efficiently in order to maximize the customer service capacity of the facility and the value of the service provided.

DETAILED DESCRIPTION

Figure 1:
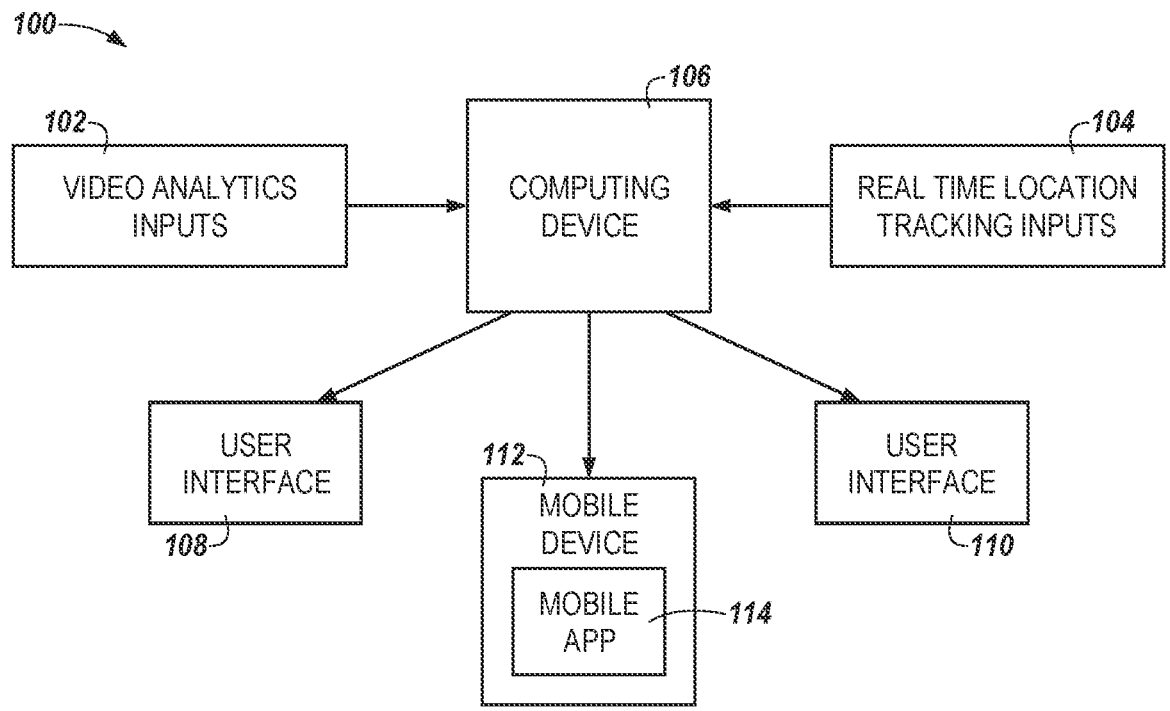
FIG. 1 illustrates an example of a system for providing security and customer service using video analytics and location tracking in accordance with an embodiment of the present disclosure.

Devices, methods, and systems for providing security and customer service using video analytics and location tracking are described herein. For example, an embodiment includes a memory, and a processor configured to execute executable instructions stored in the memory to identify, using video analytics, security incidents occurring in a facility and customer service opportunities occurring in the facility, determine, upon identifying a security incident occurring in the facility, a workflow sequence for responding to the security incident, determine, upon identifying a customer service opportunity occurring in the facility, a workflow sequence for responding to the customer service opportunity, display the workflow sequence for responding to the security incident on a first user interface, and display the workflow sequence for responding to the customer service opportunity on a second user interface.

Embodiments of the present disclosure can use (e.g., combine) real time video analytics (e.g., facial recognition) and location tracking to provide both security and customer service in a facility, such as, for instance, a casino, where both security incidents and customer service opportunities may occur. For instance, embodiments of the present disclosure can use real time video analytics and location tracking to quickly and efficiently identify and respond to both security incidents and customer service opportunities occurring in such a facility. For instance, embodiments of the preset disclosure can use real time video analytics and location tracking to quickly and efficiently identify security incidents and customer service opportunities, and quickly and efficiently determine and provide workflow sequences and deploy staff for responding thereto.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that mechanical, electrical, and/or process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 102 may reference element "02" in FIG. 1, and a similar element may be referenced as 202 in FIG. 2.

As used herein, "a" or "a number of" something can refer to one or more such things, while "a plurality of" something can refer to more than one such things. For example, "a number of incidents" can refer to one or more incidents, while "a plurality of incidents" can refer to more than one incident.

FIG. 1 illustrates an example of a system 100 for providing security and customer service using video analytics and location tracking in accordance with an embodiment of the present disclosure. System 100 can be associated with (e.g., included in and/or part of) a facility (e.g., building), such as, for instance, a casino, in which both security incidents and customer service opportunities may occur. However, embodiments of the present disclosure are not limited to particular type of facility. For instance, additional examples of the facility can include an airport and a government building, among others.

As shown in FIG. 1, system 100 can include a computing device 106. An example of such a computing device will be further described herein (e.g., in connection with FIG. 3). For instance, such a computing device can be part of an analytics service associated with the facility, and can include a memory and a processor, as will be further described herein (e.g., in connection with FIG. 3).

As shown in FIG. 1, system 100 can include a first user interface (e.g., user interface 108) and a second user interface (e.g., user interface 110). As used herein, a "user interface" can include and/or refer to a mechanism via which a user (e.g., operator) can interact with a computing device (e.g., computing device 106). For example, a user interface can provide (e.g., display) information to, and receive information from (e.g., input by), the user. In an embodiment, a user interface can be a graphical user interface (GUI) that can include a display (e.g., a screen and/or monitor) that can provide and/or receive information to and/or from the user. The display can be, for instance, a touch-screen (e.g., the GUI can include touch-screen capabilities). As an additional example, a user interface 446 can include a keyboard and/or mouse the user can use to input information. Embodiments of the present disclosure, however, are not limited to a particular type(s) of user interface.

User interface 108 can be associated with the security system of the facility. For example, user interface 108 can be located in the security control room or security control center of the facility. Such an area may be the central area of security operations for the facility, where the security cameras of the facility are monitored by security operations staff (e.g., security operators and/or facility operators), and from which mobile security teams (e.g., first response teams) and/or emergency personnel may be deployed to respond to security incidents, in order to maintain the safety and security of the facility. Such an area may be operational around the clock (e.g., 24 hours a day, 7 days a week).

User interface 108 can include and/or refer to, for example, an operator command console and/or a command wall. An operator command console can include, for instance, a plurality of display monitors (e.g., a multi-monitor configuration) designed for security operators and facility operators for day-to-day operations of the control room or center. A command wall can include, for instance, a single, large (e.g., 63 or 90 inch) touch-screen display designed for the first response team, security operations director, and emergency personnel for use in coordinating an emergency response.

User interface 110 can be associated with the customer service operations of the facility. For example, user interface 110 can include and/or refer to the user interface of a laptop computer or desktop computer used by customer service staff (e.g., guest hosts, facility managers, service technicians, etc.) to respond to customer service opportunities at a customer service location in the facility. As an additional example, user interface 110 can include and/or refer to the user interface of a mobile device (e.g., smart phone, tablet, PDA, etc.) used by customer service staff to respond to customer service opportunities in a mobile manner (e.g., while and/or by moving) throughout the facility.

As shown in FIG. 1, computing device 106 can receive video analytics inputs 102. Video analytics inputs 102 can be obtained from, for instance, a video analytics server (not shown in FIG. 1 for clarity and so as not to obscure embodiments of the present disclosure) that performs real time video analytics on images and/or videos captured by the security cameras of the facility, including, for instance, facial recognition and/or demographic analysis of people in the images and/or videos, and/or detection of unattended objects in the images and/or videos. That is, the video analytics (e.g., video analytics inputs 102) can include the real time facial recognition of people (e.g., people of interest) in the facility, such as, for instance, a VIP customer, known criminal, or blacklisted individual such as a problem gambler, and/or the real time detection of unattended objects in the facility, such as, for instance, unattended bags.

Computing device 106 can use video analytics inputs 102 to identify both security incidents occurring in the facility and customer service opportunities occurring in the facility. As used herein, a security incident can include and/or refer to any type of incident that may occur in the facility that may threaten the safety and/or security of the facility and/or the people in the facility. Examples of security incidents can include an unauthorized person entering or attempting to enter a secure area of the facility (e.g., by forcing open a door), an object (e.g. bag) being left unattended in the facility, an evacuation of the facility (e.g., due to a fire, bomb threat, active shooter, etc.), a known criminal entering or attempting to enter the facility, a fight (e.g., brawl) occurring in the facility, a slip-and-fall occurring in the facility, and the theft of an object from the facility, among others. Further, in embodiments in which the facility is a casino, examples of security incidents can also include a person identified as a blacklisted individual, such as a problem gambler, entering or attempting to enter the casino.

As used herein, a customer service opportunity can include and/or refer to any type opportunity that may arise in the facility to maximize the customer service capacity of the facility and/or the value of the service provided in the facility. Examples of customer service opportunities can include the identification of an individual or a particular demographic of an individual entering the facility. For example, in embodiments in which the facility is a casino, an example of a customer service opportunity can be a person identified as a very important person (VIP) entering the casino. As an additional example, in embodiments in which the facility is a hospital, an example of a customer service opportunity can be the identification of a child or children entering the hospital, who may need to be served by child-friendly staff.

Upon identifying a security incident occurring in the facility, computing device 106 can determine a workflow sequence for responding to the security incident. Further, upon identifying a customer service opportunity occurring in the facility, computing device 106 can determine a workflow sequence for responding to the customer service opportunity. As used herein, a workflow sequence can refer to and/or include a series of actions to take and/or steps to follow to handle and/or deal with the security incident or customer service opportunity, and/or information needed to handle and/or deal with the security incident or customer service opportunity. For instance, a workflow sequence may include actions performed automatically (e.g., automated actions performed without user input or instruction) by computing device 106, and/or actions performed manually by staff (e.g., customer service staff and/or security operations staff), mobile security teams, and/or emergency responders in the facility. Examples of workflow sequences for responding to various types of security incidents and customer service opportunities will be further described herein.

Computing device 106 can display a workflow sequence for responding to an identified security incident on user interface 108 (e.g., the user interface associated with the security system of the facility), and computing device 106 can display a workflow sequence for responding to an identified customer service opportunity on user interface 110 (e.g., the user interface associated with the customer service operations of the facility). For example, computing device 106 can send the respective workflow sequences to user interfaces 108 and 110 for display thereon via a network (not shown in FIG. 1 for clarity and so as not to obscure embodiments of the present disclosure).

The network can be a wired or wireless network. For example, the network can be a network relationship through which computing device 106 and user interfaces 108 and 110 can communicate. Examples of such a network relationship can include a distributed computing environment (e.g., a cloud computing environment), a wide area network (WAN) such as the Internet, a local area network (LAN), a personal area network (PAN), a campus area network (CAN), or metropolitan area network (MAN), among other types of network relationships. For instance, the network can include a number of servers that receive the workflow sequences determined by computing device 106, and transmit the workflow sequences to user interfaces 108 and 110 via a wired or wireless network.

As used herein, a "network" can provide a communication system that directly or indirectly links two or more computers and/or peripheral devices and allows users to access resources on other computing devices and exchange messages with other users. A network can allow users to share resources on their own systems with other network users and to access information on centrally located systems or on systems that are located at remote locations. For example, a network can tie a number of computing devices together to form a distributed control network (e.g., cloud).

A network may provide connections to the Internet and/or to the networks of other entities (e.g., organizations, institutions, etc.). Users may interact with network-enabled software applications to make a network request, such as to get a file or print on a network printer. Applications may also communicate with network management software, which can interact with network hardware to transmit information between devices on the network.

Upon identifying a security incident or customer service opportunity occurring in the facility, computing device 106 may also send (e.g., via the network) the location of the security incident or customer service opportunity in the facility, directions to the location, and/or the picture (e.g., face) of the person of interest (e.g., the known criminal, blacklisted individual, or VIP) associated with the security incident or customer service opportunity, to a mobile device (e.g., mobile device 112 illustrated in FIG. 1) for display thereon. Mobile device 112 can be, for instance, the mobile device (e.g., smart phone, tablet, PDA, etc.) of (e.g., carried by) a member of the mobile security team (e.g., in the case of a security incident) or the mobile device (e.g., smart phone, tablet, PDA, etc.) of (e.g., carried by) a memory of the customer service staff (e.g., in the case of a customer service opportunity).

For example, as shown in FIG. 1, mobile device 112 can include a mobile application (e.g., app) 114. Mobile app 114 can include and/or refer to computer readable and/or executable instructions (e.g., a computer program) designed to run on mobile device 112. Mobile app 114 may receive the location of the security incident or customer service opportunity, directions to the location, and/or the picture of the person of interest associated with the security incident or customer service opportunity, from computing device 106 (e.g., via the network), and display the received location, directions, and/or picture to the user of mobile device 112 (e.g., on the screen of mobile device 112).

As shown in FIG. 1, computing device 106 can also receive real time location tracking inputs 104. Real time location tracking inputs 104 can be obtained from, for instance, a location tracking server (not shown in FIG. 1 for clarity and so as not to obscure embodiments of the present disclosure) that performs real time location tracking of the staff (e.g., the customer service staff and/or mobile security team members) of the facility using beacons located in the facility. For instance, the real time location tracking of the staff can be performed using a plurality (e.g., network) of beacons, each located (e.g., installed) at a different respective location throughout the facility.

For example, the beacons can be devices capable of direct wireless communication with mobile devices carried by the staff of the facility, and can allow for the determination of the location of the mobile devices within the facility. For instance, each respective beacon can have a different predetermined location in the facility, and can communicate with the mobile device of a staff person when that mobile device is within a particular proximity (e.g., range) of the beacon such that the location of the mobile device can be determined (e.g., by the location tracking server) based on the communication (e.g., signals) the mobile device is currently receiving from the beacon(s) and the location of that beacon(s) from which the mobile device is currently receiving signals. The beacons can be, for example, Bluetooth beacons that can communicate with the mobile device via Bluetooth Low Energy (BLE) technology (e.g., as an iBeacon).

As such, computing device 106 can use real time location tracking inputs 104 to identify the current locations of staff (e.g., customer service staff and/or mobile security team members) in the facility. Based on the current locations of the staff in the facility, computing device 106 can deploy (e.g., provide instructions to deploy) staff to respond to an identified security incident or customer service opportunity. For example, computing device 106 can determine which of the staff (e.g., qualified staff) is currently located closest (e.g. is the nearest staff available) to the identified security incident or customer service opportunity, and deploy this staff to respond to the identified security incident or customer service opportunity.

As an example, computing device 106 can identify the current locations of the staff in the facility on a map of a floorplan of the facility. The map may include a heat mapping of the current occupancy levels in different areas of the facility, representing the approximate number of people currently in those areas of the facility. Such a heat mapping can help the customer service staff of the facility ensure there is adequate staff for (e.g., to serve) the current number of people in those areas, and/or adequate staff to meet legal (e.g., statutory and/or regulatory) staffing requirements for the facility.

Further, if computing device 106 identifies that multiple security incidents or multiple customer service opportunities are occurring in the facility concurrently (e.g., at the same time), computing device 106 can determine a priority level of each respective security incident or customer service opportunity, and prioritize the deployment of the staff to the multiple security incidents or customer service opportunities based on the priority level of each respective incident or service opportunity. For instance, computing device 106 may deploy staff to the security incident or customer service opportunity determined to have the highest priority level before deploying staff to any of the other incidents or service opportunities.

As an example in which computing device 106 uses video analytics inputs 102 to identify a guest in the facility (e.g., casino) as a blacklisted individual (e.g., problem gambler), computing device 106 can raise an alert on user interface 108 (e.g., on the video monitor of the security and/or facility operator), along with the workflow sequence for responding to the blacklisted individual. The blacklisted individual's details (e.g. profile) may also be shown to the operator. The operator can track the blacklisted individual through the facility (e.g. using the cameras of the security system of the facility), and alert staff who are in the area of the blacklisted individual. The operator can deploy the nearest qualified staff, as identified by computing device 106 using real time location tracking inputs 104, to approach the blacklisted individual and escort him or her out of the facility.

As an example in which computing device 106 uses video analytics inputs 102 to identify a guest in the facility (e.g., casino) as a VIP guest, computing device 106 can raise an alert on user interface 110 (e.g., on the video monitor of the customer service operations), with the VIP guest's details (e.g., personal preferences) shown. The operator can inform the facility staff (e.g., customer service staff) of the VIP guest, and deploy the nearest qualified staff, as identified by computing device 106 using real time location tracking inputs 104, to approach the VIP guest. The operator can also inform other staff to make preparations to accommodate the VIP guest based on the VIP guest's personal preferences. The VIP guest can be approached by the nearest staff member, who may know the VIP guest's personal preferences and can promptly host the VIP guest accordingly.

As an example in which computing device 106 uses video analytics inputs 102 to identify an unauthorized person attempting to enter a secure area of the facility, computing device 106 can raise an alert on user interface 108 (e.g., on the command console of the security operator), and initiate the appropriate workflow sequence on the command console. For instance, the security cameras nearby the incident may be orchestrated to provide the operator awareness of the situation, and the facility may be put in a security lockdown. The operator may deploy (e.g., dispatch) the mobile security team to identify and contain the unauthorized person, while the operator continues to monitor the incident. If the incident escalates, the workflow may be updated to notify emergency service personnel and prepare the mobile security team for an evacuation of the facility. Once the incident (e.g. unauthorized person) is contained, the workflow may be used to repopulate the area while keeping the secure area secure. The first responders and operator may also continue to monitor the area to ensure everyone's safety.

As an example in which computing device 106 uses video analytics inputs 102 to identify an unattended (e.g., static) object in the facility, computing device 106 can raise an alert on user interface 108 (e.g., on the command console of the security operator), and initiate the appropriate workflow sequence on the command console. For instance, the operator may navigate to the location of the object on the command console to check nearby security cameras to see if there is any other suspicious activity occurring in the area. Further, the operator can start recording video footage of the area, notify police of the incident, notify staff of the incident, and put the area on lockdown. The policy may be guided through the facility by the operator using surveillance footage. Once the incident (e.g., unattended object) is confirmed as neutralized, the area may be unlocked and an "all clear" message may be sent out (e.g. by the operator).

In an example of a fire evacuation, computing device 106 can initiate the evacuation workflow sequence on user interface 108 (e.g., on the the command console of the security operator). For instance, the operator may navigate (e.g., zoom) to the location of the fire on the command console, and the security cameras nearby the incident may be orchestrated to provide the operator awareness of the situation. As the first response team assembles, the operator may identify the areas of the facility affected by the fire, and initiate the evacuation of those areas. The operator may continue to check the exits and pathways, and monitor the crowd flow, during the evacuation using the security cameras (e.g. CCTV). Meanwhile the first response team assembles to coordinate the response and monitor the evacuation using the command wall, including deploying staff and emergency personnel to safely evacuate the facility's occupants.

Figure 2:
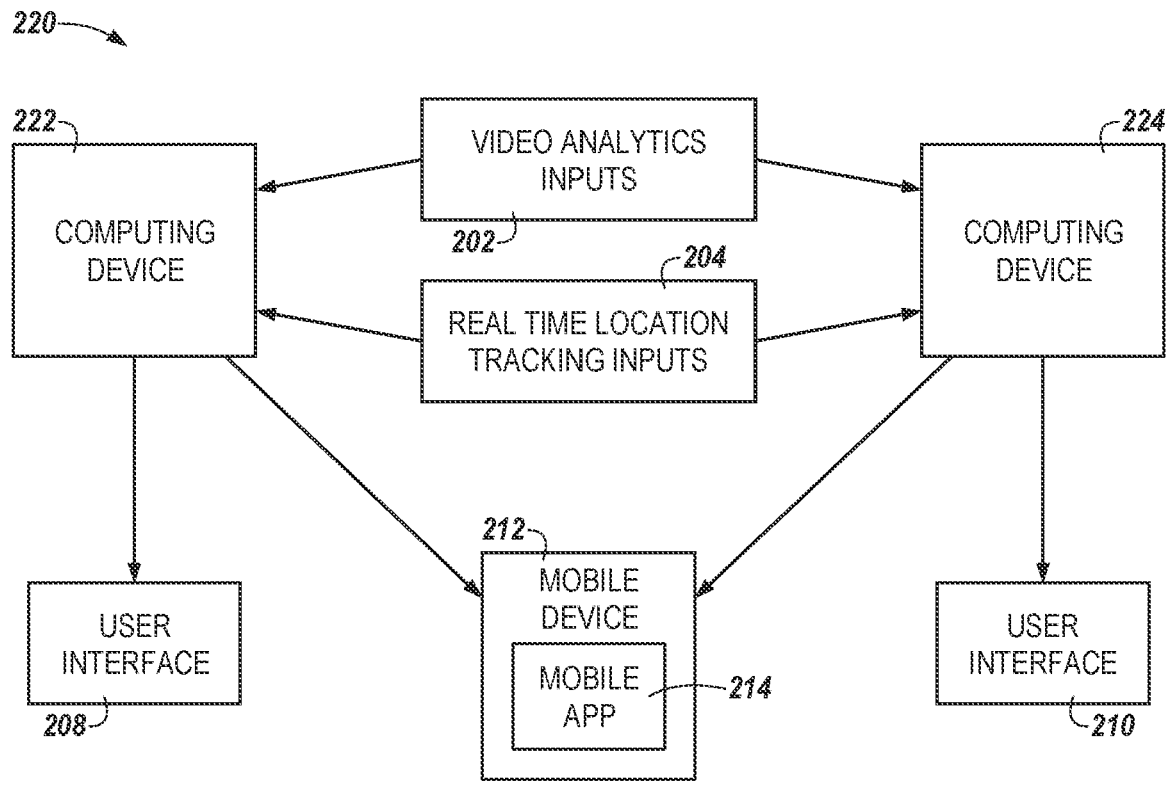
FIG. 2 illustrates an example of a system for providing security and customer service using video analytics and location tracking in accordance with an embodiment of the present disclosure.

FIG. 2 illustrates an example of a system 220 for providing security and customer service using video analytics and location tracking in accordance with an embodiment of the present disclosure. System 220 can be associated with a facility, such as, for instance, a casino, in which both security incidents and customer service opportunities may occur, in a manner analogous to the facility previously described in connection with FIG. 1.

As shown in FIG. 2, system 220 can include a first computing device (e.g., computing device 222) and a second (e.g., different and/or separate) computing device (e.g., computing device 224). An example of such computing devices will be further described herein (e.g., in connection with FIG. 3). For instance, such computing devices can be part of an analytics service, and can each include a memory and a processor, as will be further described herein (e.g., in connection with FIG. 3).

As shown in FIG. 2, system 220 can include a first user interface (e.g., user interface 208) and a second user interface (e.g., user interface 210). User interfaces 208 and 210 can be analogous to user interfaces 108 and 110, respectively, previously described in connection with FIG. 1.

As shown in FIG. 2, computing devices 222 and 224 can receive video analytics inputs 202. Video analytics inputs 202 can be analogous to video analytics inputs 102 previously described in connection with FIG. 1.

Computing device 222 can use video analytics inputs 202 to identify security incidents occurring in the facility, computing device 224 can use video analytics inputs 202 to identify customer service opportunities occurring in the facility. The security incidents and customer service opportunities can be analogous to those previously described in connection with FIG. 1.

Upon identifying a security incident occurring in the facility, computing device 222 can determine a workflow sequence for responding to the security incident. Further, upon identifying a customer service opportunity occurring in the facility, computing device 224 can determine a workflow sequence for responding to the customer service opportunity. The workflow sequences can be analogous to those previously described in connection with FIG. 1.

Computing device 222 can display a workflow sequence for responding to an identified security incident on user interface 208, and computing device 224 can display a workflow sequence for responding to an identified customer service opportunity on user interface 210. For example, computing devices 222 and 224 can send the respective workflow sequences to the respective user interfaces 208 and 210 for display thereon via a network, in a manner analogous to that previously described in connection with FIG. 1.

Upon identifying a security incident or customer service opportunity occurring in the facility, computing devices 222 and 224, respectively, may also send the location of the security incident or customer service opportunity in the facility, directions to the location, and/or the picture of the person of interest associated with the security incident or customer service opportunity, to a mobile device (e.g., mobile device 212 having mobile app 214 illustrated in FIG. 2) for display thereon. Mobile device 212 and mobile app 214 can be analogous to mobile device 112 and mobile app 114, respectively, previously described in connection with FIG. 1.

As shown in FIG. 2, computing devices 222 and 224 can also receive real time location tracking inputs 204. Real time location tracking inputs 204 can be analogous to real time location tracking inputs 104 previously described in connection with FIG. 1.

Computing devices 222 and 224 can use real time location tracking inputs 204 to identify the current locations of staff (e.g., computing device 224 can identify the locations of customer service staff and computing device 222 can identify the locations of mobile security team members) in the facility. Based on the current locations of the staff in the facility, computing device 222 can deploy staff to respond to an identified security incident, and computing device 224 can deploy staff to respond to an identified customer service opportunity, in a manner analogous to that previously described in connection with FIG. 1.

Figure 3:
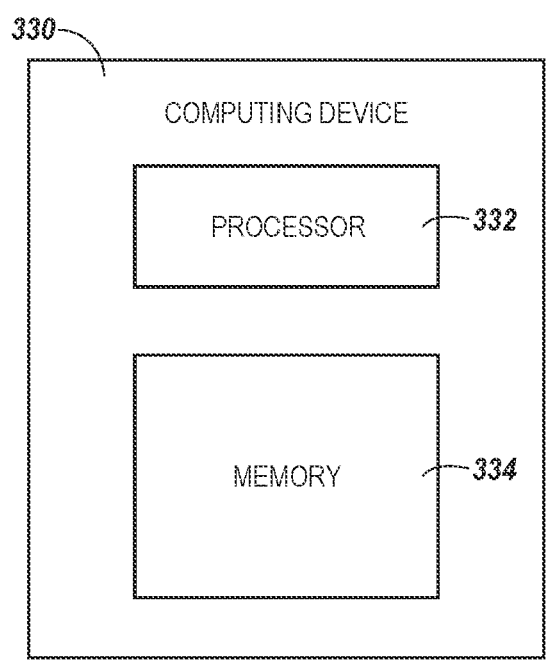
FIG. 3 illustrates an example of a computing device for providing security and customer service using video analytics and location tracking in accordance with an embodiment of the present disclosure.

FIG. 3 illustrates an example of a computing device 330 for providing security and customer service using video analytics and location tracking in accordance with an embodiment of the present disclosure. Computing device 330 can be part of an analytics service (e.g., servers and/or databases), and can be an example of, for instance, computing device 106 previously described in connection with FIG. 1 and computing devices 222 and 224 previously described in connection with FIG. 2.

As shown in FIG. 3, computing device 330 can include a processor 332 and a memory 334. Memory 334 can be any type of storage medium that can be accessed by processor 332 to perform various examples of the present disclosure. For example, memory 334 can be a non-transitory computer readable medium having computer readable instructions (e.g., computer program instructions) stored thereon that are executable by processor 334 to provide security and customer service using video analytics and location tracking in accordance with the present disclosure. That is, processor 332 can execute the executable instructions stored in memory 334 to provide security and customer service using video analytics and location tracking in accordance with the present disclosure.

Memory 334 can be volatile or nonvolatile memory. Memory 334 can also be removable (e.g., portable) memory, or non-removable (e.g., internal) memory. For example, memory 334 can be random access memory (RAM) (e.g., dynamic random access memory (DRAM), resistive random access memory (RRAM), and/or phase change random access memory (PCRAM)), read-only memory (ROM) (e.g., electrically erasable programmable read-only memory (EEPROM) and/or compact-disk read-only memory (CD-ROM)), flash memory, a laser disk, a digital versatile disk (DVD) or other optical disk storage, and/or a magnetic medium such as magnetic cassettes, tapes, or disks, among other types of memory.

Further, although memory 334 is illustrated as being located in computing device 330, embodiments of the present disclosure are not so limited. For example, memory 334 can also be located internal to another computing resource (e.g., enabling computer readable instructions to be downloaded over the Internet or another wired or wireless connection).

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A computing device for providing security and customer service for a facility having one or more cameras, comprising:
  a memory;
  one or more processors configured to execute executable instructions stored in the memory to:
    receive images and/or videos captured by the one or more cameras of the facility;
    apply video analytics to the received images and/or videos in order to:
      identify security incidents occurring in the facility and to capture from the images and/or videos a picture representative of each of the identified security incidents;
      identify customer service opportunities occurring in the facility and to capture from the images and/or videos a picture representative of each of the identified customer service opportunities;
    identify current locations of one or more staff members within the facility using real time location tracking, wherein the real time location tracking includes using one or more transmitters located at known geographical locations that are each capable of wireless communication with a mobile device carried by each of the one or more staff members, wherein the current location of each of the mobile devices, and thus the current location of each of the staff members carrying a corresponding mobile device, is identified based at least in part on the wireless communication between the corresponding mobile device and one or more of the transmitters along with the known geographical location of the corresponding one or more transmitters;
    upon identifying by the video analytics a security incident occurring in the facility:
      identify an appropriate staff member to respond to the security incident based at least in part upon the staff member's current location within the facility;
      transmit an indication of the security incident and the picture representative of the identified security incident for display on a first user interface corresponding to the mobile device carried by the appropriate staff member for responding to the security incident;

upon identifying by the video analytics a customer service opportunity occurring in the facility:
identify an appropriate staff member to respond to the customer service opportunity based at least in part upon the staff member's current location within the facility; and
transmit an indication of the customer service opportunity and the picture representative of the identified customer service opportunity for display on a second user interface corresponding to the mobile device carried by the appropriate staff member for responding to the customer service opportunity.

2. The computing device of claim 1, wherein the one or more processors are configured to execute executable instructions stored in the memory to:
determine a priority level for each of the identified security incidents and the identified customer service opportunities;
prioritize deployment of one or more staff members within the facility in accordance with the priority level for each of the identified security incidents and the identified customer service opportunities;
upon identifying by the video analytics a security incident occurring in the facility, identify the appropriate staff member, if any, to respond to the security incident based at least in part upon the deployment prioritization for the identified security incident and the staff member's current location within the facility; and
upon identifying by the video analytics a customer service opportunity occurring in the facility, identify the appropriate staff member, if any, to respond to the customer service opportunity based at least in part upon the deployment prioritization for the identified customer service opportunity and the staff member's current location within the facility.

3. The computing device of claim 1, wherein the one or more processors are configured to execute instructions to, upon identifying by the video analytics a security incident occurring in the facility:
determine a workflow sequence for responding to the security incident; and
transmit the workflow sequence for responding to the security incident for display on the first user interface corresponding to the mobile device carried by the appropriate staff member for responding to the security incident.

4. The computing device of claim 3, wherein the one or more processors are configured to execute instructions to, upon identifying by the video analytics a customer service opportunity occurring in the facility:
determine a workflow sequence for responding to the customer service opportunity; and
transmit the workflow sequence for responding to the customer service opportunity for display on the second user interface corresponding to the mobile device carried by the appropriate staff member for responding to the customer service opportunity.

5. The computing device of claim 4, wherein the workflow sequence for responding to the security incident and the workflow sequence for responding to the customer service opportunity each include:
an action performed automatically by the computing device; and
an action performed manually by the appropriate staff member.

6. The computing device of claim 1, wherein the video analytics includes facial recognition of people in the facility.

7. The computing device of claim 1, wherein the video analytics includes detection of unattended objects in the facility.

8. The computing device of claim 1, wherein the one or more processors are configured to execute instructions to:
transmit, upon identifying the security incident occurring in the facility, a location of the security incident and directions to the location of the security incident for display on the first user interface corresponding to the mobile device carried by the appropriate staff member for responding to the security incident; and
transmit, upon identifying the customer service opportunity occurring in the facility, a location of the customer service opportunity and directions to the location of the customer service opportunity for display on the second user interface corresponding to the mobile device carried by the appropriate staff member for responding to the customer service opportunity.

9. A method for providing security and customer service, comprising:
receiving images and/or videos captured by one or more cameras of a facility;
applying video analytics to the received images and/or videos in order to:
identify security incidents occurring in the facility and to capture from the images and/or videos a picture representative of each of the identified security incidents;
identify customer service opportunities occurring in the facility and to capture from the images and/or videos a picture representative of each of the identified customer service opportunities;
identifying current locations of one or more staff members within the facility using one or more transmitters located at known geographical locations that are each capable of wireless communication with a mobile device carried by each of the one or more staff members, wherein the current location of each of the mobile devices, and thus the current location of each of the staff members carrying a corresponding mobile device, is identified based at least in part on the wireless communication between the corresponding mobile device and one or more of the transmitters along with the known geographical location of the corresponding one or more transmitters;
upon identifying by the video analytics a security incident occurring in the facility:
identifying an appropriate staff member to respond to the security incident based at least in part upon the staff member's current location within the facility;
sending an indication of the security incident and the picture representative of the identified security incident for display on a first user interface corresponding to the mobile device carried by the appropriate staff member for responding to the security incident;
upon identifying by the video analytics a customer service opportunity occurring in the facility:
identifying an appropriate staff member to respond to the customer service opportunity based at least in part upon the staff member's current location within the facility; and
sending an indication of the customer service opportunity and the picture representative of the identified customer service opportunity for display on a second user interface corresponding to the mobile device carried by the appropriate staff member for responding to the customer service opportunity.

10. The method of claim 9, further comprising:
determining a priority level for each of the identified security incidents and the identified customer service opportunities;
prioritizing deployment of one or more staff members within the facility in accordance with the priority level for each of the identified security incidents and the identified customer service opportunities;
upon identifying by the video analytics a security incident occurring in the facility, identifying the appropriate staff member, if any, to respond to the security incident based at least in part upon the deployment prioritization for the identified security incident and the staff member's current location within the facility; and
upon identifying by the video analytics a customer service opportunity occurring in the facility, identifying the appropriate staff member, if any, to respond to the customer service opportunity based at least in part upon the deployment prioritization for the identified customer service opportunity and the staff member's current location within the facility.

11. The method of claim 9, wherein upon identifying by the video analytics a security incident occurring in the facility:
determining a workflow sequence for responding to the security incident; and
sending the workflow sequence for responding to the security incident for display on the first user interface corresponding to the mobile device carried by the appropriate staff member for responding to the security incident.

12. The method of claim 11, wherein upon identifying by the video analytics a customer service opportunity occurring in the facility:
determining a workflow sequence for responding to the customer service opportunity; and
sending the workflow sequence for responding to the customer service opportunity for display on the second user interface corresponding to the mobile device carried by the appropriate staff member for responding to the customer service opportunity.

13. The method of claim 12, wherein the workflow sequence for responding to the security incident and the workflow sequence for responding to the customer service opportunity each include:
an action performed automatically; and
an action performed manually by the appropriate staff member.

14. The method of claim 9, wherein the video analytics includes one or more of facial recognition of people in the facility and detection of unattended objects in the facility.

15. The method of claim 9, wherein the one or more transmitters at known geographical locations comprise a plurality of beacons, where the plurality of beacons are located at different respective locations in the facility.

* * * * *